United States Patent Office 3,440,301
Patented Apr. 22, 1969

3,440,301
DYNAMIC STABILIZATION OF A PLATINUM-ALUMINA CATALYST IN AN ISOMERIZATION REACTION
William L. Lafferty, Jr., and Edward T. Child, Fishkill, and John H. Estes, Wappingers Falls, N.Y., and George W. Vachuda, Houston, Tex., assignors to Texaco Inc., New York, N.Y., a corporation of Delaware
No Drawing. Filed Sept. 27, 1966, Ser. No. 582,250
Int. Cl. C07c 5/30
U.S. Cl. 260—683.68           10 Claims

ABSTRACT OF THE DISCLOSURE

A platinum-alumina catalyst activated with a halogenated hydrocarbon is stabilized by heating the halogenated catalyst at a temperature of 600–1200° F. with a non-reactive gas, such as air, nitrogen, hydrogen or helium flowing through said catalyst, adjusting the temperature to 150–700° F. and thereafter contacting the catalyst with hydrogen chloride or hydrogen bromide for at least 0.5 hour at 150–700° F. The catalyst may be stabilized in situ and utilized in an isomerization reaction.

---

This invention relates to a hydrocarbon conversion process and, more particularly, to a process and catalyst for the isomerization of isomerizable hydrocarbons. In accordance with this invention, a commercially useful process for isomerizing hydrocarbons particularly those within the range of $C_4$–$C_6$ inclusive is provided together with a new and useful catalyst and method of making the same having an extended life over those heretofore known or employed. The term "stabilization" as used herein refers to the process of imparting to a catalyst extended catalytic life.

U.S. Patent 3,242,288 of Mar. 22, 1966, entitled "Hydrocarbon Isomerization Process and Catalyst" to Riordan et al. is directed to the preparation of a novel isomerization catalyst useful in isomerizing normal paraffins in the $C_4$–$C_6$ range which is prepared by compositing platinum and alumina wherein the major portion is alumina and platinum is present in amounts between about 0.01 and 1 percent by weight. The composite is contacted with a chloride activating agent, e.g. carbon tetrachloride, chloroform, methylene chloride, phosgene, and trichloroacetyl chloride at a temperature within the range of 300–600° F. to thereby form a chlorided composite wherein the chloride is present in the range of about 3–10 percent by weight. This composite can thereafter be heated to a temperature within the range of say 400–1000° F. whereby part of the chloride is removed therefrom forming a catalyst containing chlorine in the range from about 2.5 to 7 weight percent.

The resulting chloride activated and heat treated catalyst is highly active in the isomerization of the aforementioned paraffin hydrocarbons at standard isomerizing conditions within the range of 200–400° F. using an LHSV within the range of about 0.5–10.0 with a hydrogen to hydrocarbon mol ratio of between about 0.05:1 and 5.0:1 and preferably within the range of about 2:1 to 5:1 for pentanes and hexanes and about 0.1:1 to 1:1 for butanes.

The heat treatment so provided in accordance with that patent removes some of the chloride under either static conditions or a stream of gas can be passed through the catalyst to assist in displacing the evolved gas and provide uniform flow of heat through the system. For this purpose, hydrogen chloride is preferred. A flow of hydrogen chloride gas of about .010–.015 volume per minute per volume of catalyst readily displaces evolved volatile materials from the catalyst. In commercial operations employing large volumes of feed to the isomerization reactor together with relatively large amounts of catalyst it is desired to use an in-situ flow or dynamic method of stabilizing the isomerization catalyst. Static methods are not desirable since they do not permit preparation and/or regeneration of the catalyst on a commercial sized scale in a short period of time without externally heating the reactor. Furthermore, a stabilization step wherein the flow rate of gas through the catalyst is inordinately low viz: .010–.015 takes a long period of time and is not particularly adapted to continuous commercial operations.

It has been found that in a dynamic stabilization process wherein volumes of gas, e.g. hydrogen passes over the catalyst at high temperatures a portion of the chloride is removed. Hence, if large volumes of catalyst are subjected to large volumes of gas at high temperatures and high flow rates after a period of time, e.g. such as that required to adequately stabilize a commercial amount of catalyst, the activity is somewhat decreased.

It is an object of this invention, therefore, to provide a process for preparing a catalyst having an extended catalytic life and useful as a catalyst for hydrocarbon conversion.

It is another object of this invention to provide a process for preparing a catalyst having said long catalytic life wherein the catalyst is subjected to a stabilization step which does not adversely affect the catalytic activity even under the most severe conditions.

It is an object of this invention, also, to provide a new and useful catalyst prepared from the stabilization step.

It is still another object of this invention to provide a new and useful process for isomerizing paraffin in the $C_4$–$C_6$ inclusive range using the catalyst of this invention.

These and other objects of this invention will become apparent from the following complete description of our invention and appended claims.

The instant invention is an improvement in the method of stabilizing platinum-alumina composite catalysts activated using a halohydrocarbon e.g. a chlorinated hydrocarbon as disclosed below. The catalyst is useful in hydrocarbon conversion particularly hydrocracking, alkylation of alkylatable hydrocarbons and isomerization of isomerizable hydrocarbons. In accordance with the invention, a halogenated hydrocarbon activated platinum-alumina composite is stabilized dynamically by the steps of:

(a) Heating the composite to a temperature between 600 and 1200° F., suitably 800° F., in the presence of a nonreactive gas, suitably air, nitrogen, hydrogen, or helium, suitably under a pressure of between about 0 p.s.i.a. and 1000 p.s.i.g., most suitably 400 p.s.i.g., said nonreactive gas flowing through said composite at a volumetric flow rate of at least 300, preferably between 300 and 50,000, standard cubic feet per hour per square foot of reactor cross-section for at least 0.1 hour, generally up to 20 hours, suitably 2 hours;

(b) Adjusting the temperature of the so-heated composite in the presence of a nonreactive gas at a pressure of between about 0 p.s.i.a. and 1,000 p.s.i.g. to between 150 and 700° F., suitably 350° F.; and (c) Contacting said composite with hydrogen chloride or hydrogen bromide admitted at a dosage of between 1 and 1,000 volumes HCl or HBr at standard conditions of 60° F. and 1 atmosphere per volume of composite over a period of between 0.5 and 24 hours at a temperature between 150 and 700° F. and at a pressure of between about 0 p.s.i.a. and 1,000 p.s.i.g. preferably in the presence of a non-reactive gas, most suitably hydrogen, flowing through the composite at a volumetric flow rate of between 500 and 50,000 standard cubic feet per hour per square foot of reactor cross-section.

In a particularly desirable embodiment, the dynamic stabilization process of this invention is performed by heating the activated platinum-alumina composite to between 800 and 1,000° F. in hydrogen at a pressure of between about 0 p.s.i.a. and 400 p.s.i.g., said hydrogen being passed through said composite at a rate of between 900 and 20,000 standard cubic feet per hour per square foot of reactor cross-section over a period of between 2 and 6 hours adjusting the temperature of the so heated composite to between 300 and 400° F. while passing hydrogen through said composite under a pressure of between about 0 p.s.i.a and 400 p.s.i.g.; continuing hydrogen addition at a rate of between 900 and 15,000 standard cubic feet per hour per square foot reactor cross-section at a temperature of between 300° F. and 400° F. and a pressure of between about 0 p.s.i.a. and 100 p.s.i.g.; and contacting the composite with HCl or HBr admitted at a dosage between 1 and 1,000 volumes (at standard conditions of 60° F. and 1 atmosphere) per volume composite over a period of between 1 and 10 hours. The process of this invention is suitably performed by an in situ method, i.e., within the isomerization or other hydrocarbon conversion reactor itself. The process can also be dynamically performed by withdrawing the catalyst to be stabilized from the hydrocarbon conversion vessel and charging the same into a separate reactor for dynamic catalyst stabilization. In such a case, a fixed bed, or fluidized bed system as more fully described below can be employed.

Activated catalysts which can be stabilized according to the dynamic stabilization process of the instant invention include those catalysts prepared by contacting a platinum-alumina composite with an organic halide, e.g. an organic chloride containing at least 2 carbon atoms and a mol ratio of hydrogen to chlorine less than 1.0 in an atmosphere containing gaseous oxygen under activating conditions preferably at a temperature of 300–800° F. In such a case, a temperature lower than 300° F. can be employed to produce a catalyst which can be stabilized according to the invention, the range of 300–800° F. being preferred. Such a method prepares a catalyst containing about 0.01 to about 2.0 weight percent platinum and about 3.0 to 12% chlorine. Still other catalysts which can be stabilized by our dynamic stabilization procedure are those catalysts prepared by forming a composite comprising a major portion of alumina and 0.01 to about 1 percent by weight platinum and contacting the composite with an activating agent such as carbon tetrachloride, chloroform, methylene chloride, phosgene, trichloroacetyl chloride and hexachlorobutadiene ($CCl_2=CCl—CCl=CCl_2$) and heating the composite with the activating agent under conditions of temperature and pressure sufficient to cause activation of the catalyst, preferably in the range of about 300 to 650° F. It should be realized that the foregoing catalysts are only illustrative of those catalysts which can be stabilized according to the instant process.

In this application, the term "standard cubic feet per hour (s.c.f.h.) per square foot of reactor cross-section" means the volumetric flow rate at standard conditions (60° F. 1 atmosphere) per area of reactor cross-section and the term "non-reactive gas" means a gas which does not react substantially with the composite or with my agents subsequently introduced to the system to the extent as to preclude stabilization of a catalyst. In this regard, air is contemplated within the definition although it reacts to some extent with HCl subsequently added to the system but not to the extent as to preclude stabilization of the catalyst. Since air sets up a corrosive atmosphere its use is not preferred.

In a still more desirable embodiment of this invention, a catalyst useful for the isomerization of isomerizable hydrocarbons particularly those in $C_4$–$C_6$ range is prepared and stabilized by heating a platinum-alumina composite containing about 0.01–2.0 weight percent platinum at a temperature between 700 and 1300° F. most suitably, 1000° F. in the presence of air over a period of between 8 and 12 hours under a pressure between 0.25 and 70 atmospheres, conveniently 1 atmosphere, to dehydrate the composite and prepare the same for a subsequent activation. It is preferred that the air utilized have a dew point between +10° F. and −100° F. most suitably −30° F. and that the air flow be reversed for the last 2 hours of the dehydration step. The dehydrated platinum-alumina composite is then activated using a multi-chlorinated hydrocarbon, e.g. carbon tetrachloride by injecting the same into a vessel containing the dehydrated platinum-alumina composite together with a dry gas, such as air, nitrogen, or helium in amounts sufficient to prepare a chlorinated hydrocarbon activated platinum-alumina catalyst containing chlorine in the amount of 3–12 weight percent, based on the weight of the activated catalyst. The activation of the platinum-alumina catalyst is preferably performed using a dry gas-multi-chlorinated hydrocarbon reverse flow after 80 percent of the multi-chlorinated hydrocarbon has been admitted to the vessel containing the platinum-alumina composite. This reverse gas treatment has been found to provide greater uniformity of activation of the platinum-alumina composite within the bed particularly at the center of the bed and the portion of the bed proximate the gas exit. The activated catalyst is then stabilized dynamically by the method disclosed above using HCl or HBr. For obvious economic reasons we prefer HCl.

We found that the dynamic stabilization process of this invention can be utilized in commercial size operations with great ease and with limited operational expense and without the necessity of costly equipment. In fact, this invention provides an in situ dynamic stabilization process which can stabilize the catalyst within the isomerization reactor itself. Hence, we provide a process which can be performed without the necessity of withdrawing the catalyst from the isomerization or other hydrocarbon conversion reactor. We have found that our process provides a highly active catalyst characterized by an extremely long catalytic life particularly with respect to n-butane isomerization at high activity levels.

As stated above the process of this invention need not be performed in situ. It can be performed in a static heating zone wherein the non-reactive gas, e.g. hydrogen, oxygen, nitrogen, helium and/or air used in the heating step is introduced as a stream passing over or through the activated catalyst in the fixed bed. In this case, means can be employed to expose the entire surface of the catalyst to the flow of non-reactive gas therethrough. In the case of a fixed bed system agitating means can be utilized. In still another embodiment, a rotating tumbler equipped with flights or baffles can be used, the tumbler being equipped with gas-inlet and exit means through which the gases at the various temperatures enter or exit. The composite's temperature is then adjusted to between 150° F. and 700° F., preferably about 350° F., with continued addition of gas at the rate above specified. In commercial operations this can be done by the same general method as the heat treatment portion of the dynamic stabilization step. The same pressure as the pressure used during the heating portion of the stabilization process can be maintained on the dynamically heat treated platinum-alumina composite. The catalyst composite is contacted with HCl or HBr at a dosage of between 1 and 100 volumes (standard conditions) per volume of catalyst over a period of between 1 and 3 hours. The non-reactive gas flows through the fixed bed or fluidized bed at a rate of between 500 and 10,000 standard cubic feet per hour per square foot of reactor cross-section at a pressure within the range of about 0 p.s.i.a. to about 100 p.s.i.g.

The treatment of the platinum-alumina composite whose temperature has been adjusted to between 150° and 700° F., which HCl is essential for preparation of highly active catalysts characterized by long catalytic life in accordance with our process. A dosage of HCl of at least 1 volume per volume of activated catalyst is essential. If the dosage is below this minimum then the catalyst so prepared does not have the desired activity and/or catalytic life. On the other hand, one can suitably exceed the maximum dosage of 1,000 volume HCl (standard conditions) per volume composite without deleterious effect. However, this does not provide any significant benefit and represents economical inefficiency and loss of time. Concomitant with this required dosage it is important that the activated composite be treated with hydrogen chloride for a period of at least 0.5 hour. This is desired because treatment for less period of time does not provide the required chemical-physical interaction of the halogen acid with the composite sufficient to provide a highly activated catalyst having extended catalytic life. On the other hand, it is not harmful to treat the catalyst for longer than 24 hours and, in fact, some advantage can occur. Generally, however, appreciable lengthening of the catalyst life and/or increase in the activity is not obtained. Furthermore, use of a low volumetric flow rate say between .010 and .015 volume HCl per minute per volume of catalyst is not suited for continuous dynamic in situ catalyst stabilization since it involves treatment over an inordinately long period of time without any attendant advantage. Our process is advantageously carried out using at least a flow rate of non-reactive gas e.g., hydrogen during the HCl or HBr treatment step, through the catalyst particles, of at least 510 s.c.f.h. per square foot of reactor cross section.

In order to more fully illustrate the nature of the instant invention and the manner of practicing the same the following example is presented showing the best mode contemplated by us for carrying out our invention.

Example 1

Into a 12 foot by 1.5" diameter nickel tube was charged a platinum-alumina composite prepared by pilling beta-alumina trihydrate, calcining at 930° F. for 2 hours, recycling to room temperature, impregnating with an aqueous solution of chloroplatinic acid and ethylene diamine, drying, calcining at 1,050° F. for 2 hours. The platinized alumina composite resulting therefrom was predominantly eta alumina containing 0.6 weight percent platinum. The composite was heated in bed form at 100° F. and atmospheric pressure with −30° F. dew point air flow therethrough at a rate of 3,550 s.c.f.h. per square foot of reactor cross section. The heated composite was held at that temperature during air flow for 10 hours after the outlet air dew point reached −20° F. For 4 of the 10 hours the direction of the air flow was reversed. There was then introduced into the nickel tube −30° F. dew point air at 475° F. at 50 p.s.i.g. flowing at a rate of 3,550 s.c.f.h. per square foot of reactor cross section. Carbon tetrachloride at a dosage of 11 volumes CCl₄ for 100 volumes of platinum-alumina composite was introduced and after 80% of the CCl₄ had been added the flow of the carbon tetrachloride was reversed. The catalyst was then heated to 800° F. in hydrogen at 400 p.s.i.g., the hydrogen flowing therethrough at a rate of 3,550 s.c.f.h. per square foot of reactor cross section for a period of 2 hours. The hydrogen addition was continued without the application of heat until the temperature of the bed reached 350° F. Hydrogen addition continued at a rate of 3,550 s.c.f.h. per square foot of reactor cross section at 350° F. under a pressure of 1 atmosphere while HCl at a dosage of 56 volumes per volume of catalyst was added over a 5-hour period. As a result, there was prepared a highly active catalyst useful in hydrocarbon conversion, particularly isomerization, e.g. of $C_4$–$C_6$ hydrocarbons. This catalyst was exposed to normal butane at 335° F. under a pressure of 500 p.s.i.g. together with hydrogen. The liquid hourly space velocity was 2 and the mol ratio of hydrogen to n-butane was 0.2. 60% of the n-butane fed through the catalyst bed was converted to isobutane over a period of 788 hours. This is equivalent to 5.3 barrels of n-butane per 100 pounds of catalyst.

Instead of using HCl in the stabilization process of this invention, one can use HBr. When HBr is used the same manipulative steps are employed. The composite is contacted with the HBr at the same temperatures and pressures broadly recited above for HCl stabilization. The HBr dosage is the same as HCl, i.e. between 1 and 1,000 volumes HBr at standard conditions of 60° F. and 1 atmosphere per volume of composite. Using HBr provides a new and useful hydrocarbon conversion catalyst which when employed in a n-hexane isomerization process at the aforementioned conditions of temperature, pressure, etc. for n-hexane isomerization provides a 30% conversion of the n-hexane to 2,2-dimethyl butane and a total conversion of 90.0%.

Example 2

A platinum-alumina composite activated as in Example 1 was heated at 800° F. under a pressure of 400 p.s.i.g. in a 1 inch diameter reactor with a hydrogen flow through the vessel of 915 s.c.f.h. per square foot of reactor cross section. The temperature was reduced to about 400° F. after 2 hours and 1 part HBr to 10 parts nitrogen at a flow rate of ½ cubic foot/hr. at 1 atmosphere were introduced into the vessel. The stabilized catalyst had about 5.1% by weight bromine therein and 5.3% by weight chlorine. Normal hexane evaluation of the catalyst under isomerizing conditions at 300° F. showed 29.7% conversion of the n-hexane to 2,2 dimethyl butane with a total conversion of n-hexane of 90.0%.

Catalysts dynamically stabilized by the process of our invention are active for a period upwards of about one year depending upon the impurities present in the hydrocarbon feed stock to the isomerization reaction and the specific isomerization parameters employed. The catalysts are also active to give about a 61.5 weight percent conversion of normal butane to isobutane at say 2-LHSV. Slightly lower conversion of normal butane to isobutane results when the liquid hourly space velocity is doubled to 4 and even lower when increased to 8. Hence, we prefer that the isomerization of n-butane be performed using a liquid hourly space velocity of between 0.5 and 10.0 most preferably 0.75 to 4.0 and temperatures of about 300–400° F., and preferably within the range of about 315–350° F. Normal hexane is converted to 2,2-dimethyl butane and other isomers within the range of 200–350° F. preferably 280–300° F. at conversion rates to 2,2-dimethyl butane well above 30%. A light straight run naphtha having an unleaded research octane number (RON) of 71 and a leaded RON (3 cc. tetraethyl lead) of 90 is upgraded to an unleaded RON of about 83 and a leaded RON (3 cc. tetraethyl lead) of 97 by isomerizing the naphtha under the above conditions using a catalyst stabilized by our process. The final stabilized catalyst according to our invention has about 0.01 to 2% by weight platinum, a major portion of an alumina, and about 3–10% by weight of chlorine.

To illustrate the importance of utilizing i.e. dynamic stabilization step according to the present invention it has been found that using tetrachloroethylene as the activating agent for a platinum-alumina composite that the percent conversion of normal hexane for an unstabilized catalyst is only 24 wt. percent by the standard hexane screening test. Statistically stabilized at 1000° F. for 2 hours the catalyst enables conversion of normal hexane to 2,2-dimethyl butane of 31.3%, when stabilized by the dynamic stabilization process of the invention by heating the so activated alumina-platinum composite to 1000° F. for 2 hours in flowing hydrogen then retreating with HCl at 500° F. for 1 hour the catalyst gives a catalyst which provides 34 wt. percent conversion to 2,2-dimethyl butane according to this standard screening test. This figure is similar to the results obtained using carbon tetrachloride as the activator.

From the foregoing, it is readily seen that we have provided an extremely valuable process for stabilizing platinum-alumina catalysts activated by treatment with halogenated hydrocarbons. Our process is particularly suited for in situ stabilization of these catalysts to provide them with a substantially longer catalytic life at substantially the same activity levels as the unstabilized catalysts. Our process is easily scaled up for commercial size operations with minimum expenditure. Furthermore our process can be performed easily and does not entail use of expensive chemicals, etc.

The terms and expressions which have been employed are used as terms of description and not of limitation as there is no intention, in the use of such terms and expressions, of excluding any equivalents of the features shown and described or portions thereof, but it is recognized that various modifications are possible within the scope of the invention claimed.

For instance, the process of our invention can be performed dynamically by forming the HCl or HBr in situ. This can be done by charging hydrogen into the vessel containing the activated composite together with a reducible organic chloride or organic bromide which forms HCl or HBr on contact with hydrogen which can be used in the situ formation of HCl are carbon tetrachloride, tetrachloroethylene, tetrachloroethane, methyl chloride, etc.

What is claimed is:

1. A process for stabilizing a halogenated hydrocarbon activated platinum-alumina composite which comprises:
  (a) heating the composite for at least 0.1 hour at a temperature between 600 and 1200° F. in the presence of a non-reactive gas flowing through said composite at a volumetric flow rate of at least 300 standard cubic feet per hour per square foot of reactor cross section;
  (b) adjusting the temperature of the so-heated composite in the presence of a non-reactive gas to between 150° F. and 700° F.; and
  (c) contacting said composite with at least 1 volume of hydrogen chloride or hydrogen bromide per volume of composite, over a period of at least 0.5 hour at a temperature between 150 and 700° F.

2. A process according to claim 1 wherein said composite is heated in the presence of a non-reactive gas under a pressure of between about 0 p.s.i.a. and 1000 p.s.i.g.; said non-reactive gas flows through said composite at a volumetric flow rate of between 300 and 50,000 standard cubic feet per hour per square foot of reactor cross section for a period of time between 0.1 and 20 hours; said non-reactive gas is under a pressure of between about 0 p.s.i.a. and 1,000 p.s.i.g., while the temperature of the so-heated composite is adjusted to between 150° F. and 700° F.; wherein the hydrogen chloride or hydrogen bromide is admitted at a dosage of between 1 and 1,000 volumes per volume of composite over period of between 0.5 and 24 hours under a pressure of between 0 p.s.i.a. and 1000 p.s.i.g.

3. A process according to claim 1 wherein said composite is heated to a temperature of 800° F. in the presence of hydrogen under pressure of 400 p.s.i.g. flowing through said composite at a rate of between 300 and 50,000 standard cubic feet per hour per square foot of reactor cross section for 2 hours; the temperature of the composite is adjusted to 350° F. in the presence of hydrogen under a pressure of between 0 p.s.i.a. and 1000 p.s.i.g.; and wherein the composite is contacted with hydrogen chloride admitted at a dosage of between 1 and 1000 volumes HCl per volume composite over a period of between 0.5 and 24 hours at a temperature of 350° F. in the presence of hydrogen flowing through the composite at a volumetric flow rate of between 300 and 50,000 standard cubic feet per hour per square foot of reactor cross section.

4. A process according to claim 2 wherein hydrogen bromide is employed in step (c).

5. A process according to claim 3 wherein said hydrogen passes through said composite at a rate of between 900 and 20,000 standard cubic feet per hour per square foot of reactor cross section while said composite is heated to between 800 and 1000° F. and the temperature of the composite is thereafter adjusted to between 300 and 400° F.

6. A process according to claim 5 wherein said hydrogen chloride is contacted with said composite at a dosage of between 1 and 100 volumes hydrogen chloride at standard conditions of 60° F., 1 atmosphere, per volume composite.

7. A process for isomerizing an isomerizable hydrocarbon which comprises contacting said isomerizable hydrocarbon at isomerization conditions with a halogenated hydrocarbon activated platinum-alumina composite dynamically stabilized in situ by the steps of:
  (a) heating the composite in an isomerization reactor for at least 0.1 hour at a temperature between 600 and 1200° F. in the presence of a non-reactive gas flowing through said composite at a volumetric flow rate of at least 300 standard cubic feet per hour per square foot of reactor cross section;
  (b) adjusting the temperature of the so-heated composite in the presence of a non-reactive gas to between 150° F. and 700° F.; and
  (c) contacting said composite with at least 1 volume of hydrogen chloride or hydrogen bromine per volume of composite, over a period of at least 0.5 hour at a temperature between 150 and 700° F.

8. A process according to claim 7 wherein said isomerization conditions include a reaction temperature within the range of about 200° F. to 400° F., a liquid hourly space velocity within the range of about 0.5 and 10 volumes hydrocarbon feed per volume of catalyst, and a hydrogen to hydrocarbon feed mol ratio of between about 0.05:1 and 5.0:1.

9. A process according to claim 8 wherein the hydrocarbon being isomerized is n-hexane.

10. A process according to claim 8 wherein the hydrocarbon being isomerized is n-pentane.

References Cited
UNITED STATES PATENTS

| | | | |
|---|---|---|---|
| 3,247,128 | 4/1966 | White et al. | 252—412 |
| 3,242,228 | 3/1966 | Riordan et al. | 260—683.68 |

PAUL M. COUGHLAN, Jr., *Primary Examiner.*

C. J. CRASANAKIS, *Assistant Examiner.*

U.S. Cl. X.R.

252—441, 442

U.S. DEPARTMENT OF COMMERCE
PATENT OFFICE
Washington, D.C. 20231

UNITED STATES PATENT OFFICE
CERTIFICATE OF CORRECTION

Patent No. 3,440,301                                            April 22, 1969

William L. Lafferty, Jr., et al.

It is certified that error appears in the above identified patent and that said Letters Patent are hereby corrected as shown below:

Column 1, line 37, "3,242,288" should read -- 3,242,228 --. Column 3, line 63, "my" should read -- any --. Column 5, line 1, "which" should read -- with --. Column 6, line 69, "Statistically" should read -- Statically --.

Signed and sealed this 9th day of June 1970.

(SEAL)
Attest:

Edward M. Fletcher, Jr.                              WILLIAM E. SCHUYLER, JR.
Attesting Officer                                           Commissioner of Patents